United States Patent
Selgas et al.

(10) Patent No.: US 11,836,261 B2
(45) Date of Patent: *Dec. 5, 2023

(54) SECURE CREDENTIALS CONTROL METHOD

(71) Applicant: BAIMMT, LLC, Alexandria, VA (US)

(72) Inventors: Thomas D. Selgas, Athens, TX (US); Jonathan Cutrer, San Angelo, TX (US)

(73) Assignee: BAIMMT, LLC, Alexandria, VA (US)

( * ) Notice: Subject to any disclaimer, the term of this patent is extended or adjusted under 35 U.S.C. 154(b) by 153 days.

This patent is subject to a terminal disclaimer.

(21) Appl. No.: 17/176,275

(22) Filed: Feb. 16, 2021

(65) Prior Publication Data

US 2021/0165893 A1 Jun. 3, 2021

Related U.S. Application Data

(63) Continuation of application No. 16/105,797, filed on Aug. 20, 2018, now Pat. No. 10,929,546, which is a (Continued)

(51) Int. Cl.
*G06F 21/60* (2013.01)
*G06F 21/33* (2013.01)
(Continued)

(52) U.S. Cl.
CPC ............ *G06F 21/604* (2013.01); *G06F 21/31* (2013.01); *G06F 21/335* (2013.01); *G06F 21/45* (2013.01);
(Continued)

(58) Field of Classification Search
CPC ...... G06F 21/604; G06F 21/31; G06F 21/335; G06F 21/45; G06F 2221/2105; G06F 2221/2131; H04L 63/0846
See application file for complete search history.

(56) References Cited

U.S. PATENT DOCUMENTS 5,204,966 A 4/1993 Wittenberg et al.
5,432,934 A 7/1995 Levin et al.
(Continued)

FOREIGN PATENT DOCUMENTS

EP 2 544 117 A1 1/2013

OTHER PUBLICATIONS

Ala-Luukko Sami, "Mobility Management in IEETF and GPRS Specifications", Helsinki University of Technology, May 15, 2000.
(Continued)

*Primary Examiner* — Mohammad W Reza
(74) *Attorney, Agent, or Firm* — K&L Gates LLP; Shu Chen

(57) ABSTRACT

Methods, apparatus, and systems are provided to secure access to an account of a user. The account may have a system administrator. The user may have a credential for accessing the secure data on the account. The methods, apparatus, and systems involve setting a universal reset credential associated with the account, denying the system administrator of the account permission to change the first credential of the access feature, and permitting the system administrator to reset the access feature from the first credential to the universal reset credential.

19 Claims, 4 Drawing Sheets

Related U.S. Application Data continuation of application No. 12/201,150, filed on Aug. 29, 2008, now Pat. No. 10,055,595.

(60) Provisional application No. 60/969,120, filed on Aug. 30, 2007.

(51) Int. Cl.
    *H04L 9/40*           (2022.01)
    *G06F 21/31*         (2013.01)
    *G06F 21/45*         (2013.01)

(52) U.S. Cl.
    CPC .. *H04L 63/0846* (2013.01); *G06F 2221/2105* (2013.01); *G06F 2221/2131* (2013.01)

(56) References Cited

U.S. PATENT DOCUMENTS

| | | | |
|---|---|---|---|
| 5,497,421 A | 3/1996 | Kaufman et al. | |
| 5,581,700 A | 12/1996 | Witte | |
| 5,673,316 A | 9/1997 | Auerbach et al. | |
| 5,708,777 A | 1/1998 | Sloan et al. | |
| 5,719,941 A | 2/1998 | Swift et al. | |
| 5,748,735 A | 5/1998 | Ganesan | |
| 5,850,443 A | 12/1998 | Van Oorschot et al. | |
| 5,941,947 A | 8/1999 | Brown et al. | |
| 6,009,173 A | 12/1999 | Sumner | |
| 6,061,448 A | 5/2000 | Smith et al. | |
| 6,151,609 A | 11/2000 | Truong | |
| 6,161,139 A | 12/2000 | Win et al. | |
| 6,182,142 B1 | 1/2001 | Win et al. | |
| 6,223,284 B1 | 4/2001 | Novoa et al. | |
| 6,370,250 B1 | 4/2002 | Stein | |
| 6,408,336 B1 | 6/2002 | Schneider et al. | |
| 6,412,070 B1 | 6/2002 | Van Dyke et al. | |
| 6,453,353 B1 | 9/2002 | Win et al. | |
| 6,533,583 B1 | 3/2003 | Sportelli | |
| 6,571,290 B2 | 5/2003 | Selgas et al. | |
| 6,625,734 B1 | 9/2003 | Marvit et al. | |
| 6,636,973 B1 | 10/2003 | Novoa et al. | |
| 6,834,112 B1 | 12/2004 | Brickell | |
| 6,871,286 B1 | 3/2005 | Cagle et al. | |
| 6,986,049 B2 | 1/2006 | Delany | |
| 7,039,949 B2 | 5/2006 | Cartmell et al. | |
| 7,051,077 B2 | 5/2006 | Lin | |
| 7,149,893 B1 | 12/2006 | Leonard et al. | |
| 7,167,981 B2 | 1/2007 | Tanimoto | |
| 7,185,192 B1 | 2/2007 | Kahn | |
| 7,213,158 B2 | 5/2007 | Bantz et al. | |
| 7,228,437 B2 | 6/2007 | Spagna et al. | |
| 7,249,261 B2 | 7/2007 | Charbonneau | |
| 7,272,231 B2 | 9/2007 | Jonas et al. | |
| 7,299,502 B2 | 11/2007 | Schmeling et al. | |
| 7,308,580 B2 | 12/2007 | Nelson et al. | |
| 7,320,076 B2 | 1/2008 | Caronni | |
| 7,330,971 B1 | 2/2008 | Kukreja et al. | |
| 7,346,930 B1 | 3/2008 | Boydstun et al. | |
| 7,487,548 B1 | 2/2009 | Conover | |
| 7,506,010 B2 | 3/2009 | Kulkarni et al. | |
| 7,680,819 B1 | 3/2010 | Mellmer et al. | |
| 7,693,285 B2 | 4/2010 | Curry | |
| 7,761,404 B2 | 7/2010 | Chen et al. | |
| 7,765,298 B2 | 7/2010 | Villavicencio | |
| 7,865,373 B2 | 1/2011 | Punzak et al. | |
| 7,869,591 B1 | 1/2011 | Nagel et al. | |
| 7,975,292 B2 | 7/2011 | Corella | |
| 7,996,683 B2 | 8/2011 | Lyseggen et al. | |
| 8,006,298 B1* | 8/2011 | Balasubramanian | G06F 21/31 726/28 |
| 8,019,085 B2 | 9/2011 | Adams et al. | |
| 8,127,149 B1 | 2/2012 | Nachenberg | |
| 8,151,112 B2 | 4/2012 | Lin | |
| 8,281,125 B1 | 10/2012 | Briceno et al. | |
| 8,296,827 B2 | 10/2012 | Paganetti et al. | |
| 8,379,857 B1 | 2/2013 | Zheng | |
| 8,379,867 B2 | 2/2013 | Selgas et al. | |
| 8,396,933 B2 | 3/2013 | Patterson | |
| 8,490,163 B1* | 7/2013 | Harsell | G06F 21/6236 726/6 |
| 8,549,317 B2 | 10/2013 | Funayama | |
| 8,583,911 B1 | 11/2013 | Miller | |
| 8,601,263 B1 | 12/2013 | Shankar et al. | |
| 8,625,802 B2 | 1/2014 | Parann-Nissany | |
| 8,649,515 B1 | 2/2014 | Zhao et al. | |
| 8,707,034 B1 | 4/2014 | Ryan | |
| 8,737,614 B1 | 5/2014 | Mulligan | |
| 8,737,624 B2 | 5/2014 | Selgas et al. | |
| 9,558,341 B1* | 1/2017 | Allababidi | G06F 21/45 |
| 9,767,299 B2 | 9/2017 | Selgas et al. | |
| 10,055,595 B2 | 8/2018 | Selgas et al. | |
| 2001/0055396 A1 | 12/2001 | Jevans | |
| 2002/0007453 A1 | 1/2002 | Nemovicher | |
| 2002/0095499 A1 | 7/2002 | Barnett et al. | |
| 2002/0129238 A1 | 9/2002 | Toh et al. | |
| 2003/0172262 A1 | 9/2003 | Curry | |
| 2004/0078603 A1 | 4/2004 | Ogura et al. | |
| 2004/0091114 A1 | 5/2004 | Carter et al. | |
| 2004/0103324 A1 | 5/2004 | Band | |
| 2004/0125957 A1 | 7/2004 | Rauber et al. | |
| 2004/0146164 A1 | 7/2004 | Jonas et al. | |
| 2005/0027713 A1 | 2/2005 | Cameron et al. | |
| 2005/0204030 A1 | 9/2005 | Koch et al. | |
| 2006/0026682 A1 | 2/2006 | Zakas | |
| 2006/0075258 A1 | 4/2006 | Adamson et al. | |
| 2006/0259960 A1 | 11/2006 | Kondo | |
| 2007/0022196 A1 | 1/2007 | Agrawal | |
| 2007/0250920 A1 | 1/2007 | Tindsay | |
| 2007/0033657 A1 | 2/2007 | Murakawa | |
| 2007/0174903 A1 | 7/2007 | Greff | |
| 2007/0255943 A1 | 11/2007 | Kern et al. | |
| 2007/0282951 A1 | 12/2007 | Selimis et al. | |
| 2008/0046982 A1* | 2/2008 | Parkinson | H04L 9/3273 726/5 |
| 2008/0065878 A1 | 3/2008 | Hutson et al. | |
| 2008/0104708 A1 | 5/2008 | Kerschbaum et al. | |
| 2008/0148067 A1 | 6/2008 | Sitrick et al. | |
| 2008/0155680 A1* | 6/2008 | Guyot | G06F 21/80 726/17 |
| 2008/0162646 A1 | 7/2008 | Pizano et al. | |
| 2008/0263642 A1 | 10/2008 | Jerez | |
| 2008/0313730 A1 | 12/2008 | Iftimie et al. | |
| 2008/0313731 A1* | 12/2008 | Iftimie | G06F 21/40 726/18 |
| 2009/0064297 A1 | 3/2009 | Selgas et al. | |
| 2009/0075630 A1 | 3/2009 | McLean | |
| 2009/0077136 A1 | 3/2009 | Igawa et al. | |
| 2009/0080650 A1 | 3/2009 | Selgas et al. | |
| 2009/0100529 A1 | 4/2009 | Livnat et al. | |
| 2009/0158037 A1 | 6/2009 | Lee et al. | |
| 2009/0198997 A1 | 8/2009 | Yeap et al. | |
| 2009/0241167 A1 | 9/2009 | Moore | |
| 2009/0259588 A1 | 10/2009 | Lindsay | |
| 2009/0300351 A1 | 12/2009 | Lei et al. | |
| 2009/0320107 A1* | 12/2009 | Corella | G06F 21/31 726/6 |
| 2010/0031321 A1* | 2/2010 | Mattsson | G06F 21/31 726/4 |
| 2010/0146268 A1 | 6/2010 | Van Dorsselaer et al. | |
| 2010/0161759 A1 | 6/2010 | Brand | |
| 2010/0169948 A1 | 7/2010 | Budko et al. | |
| 2010/0217987 A1 | 8/2010 | Shevade | |
| 2010/0257372 A1 | 10/2010 | Seifert | |
| 2010/0293147 A1 | 11/2010 | Snow et al. | |
| 2010/0318782 A1 | 12/2010 | Auradkar et al. | |
| 2010/0333116 A1 | 12/2010 | Prahlad et al. | |
| 2011/0238985 A1 | 9/2011 | Sovio et al. | |
| 2011/0264906 A1 | 10/2011 | Pourzandi et al. | |
| 2011/0289310 A1 | 11/2011 | Selgas et al. | |
| 2012/0117171 A1 | 5/2012 | Patterson | |
| 2012/0317414 A1 | 12/2012 | Glover | |
| 2013/0007464 A1 | 1/2013 | Madden | |
| 2013/0073854 A1 | 3/2013 | Patti et al. | |
| 2013/0114812 A1 | 5/2013 | Gidwani | |
| 2013/0156184 A1 | 6/2013 | Selgas et al. | |

(56) References Cited

U.S. PATENT DOCUMENTS

| | | |
|---|---|---|
| 2013/0191629 A1 | 7/2013 | Treinen et al. |
| 2013/0254536 A1 | 9/2013 | Glover |
| 2013/0254537 A1 | 9/2013 | Bogorad |
| 2013/0263240 A1 | 10/2013 | Moskovitch |
| 2013/0283060 A1 | 10/2013 | Kulkarni et al. |
| 2013/0305039 A1 | 11/2013 | Gauda |
| 2013/0318347 A1 | 11/2013 | Moffat |
| 2014/0006773 A1 | 1/2014 | Chazalet et al. |
| 2014/0140508 A1 | 5/2014 | Kamath et al. |
| 2014/0215210 A1 | 7/2014 | Wang et al. |
| 2014/0281520 A1 | 9/2014 | Selgas et al. |
| 2015/0113279 A1 | 4/2015 | Andersen et al. |
| 2018/0288065 A1 | 10/2018 | Selgas |

OTHER PUBLICATIONS

Allman et al.; "RFC 4870—DomainKeys Identified Mail (DKIM) Signatures", Network Working Group, IETF Trust; May 2007.

Menezes, Alfred J. et al., "Handbook of Applied Cryptography", 1997 CRC Press, LLC, pp. 31-32.

Microsoft, "Microsoft Exchange Hosted Encryption", Data sheet, Microsoft Corp., 2006. http://www.microsoft.com/exchange/services.

Microsoft, "Sender Reputation, Microsoft TechNet, Exchange 2007", Microsoft Corp., 2008.

Proofpoint, "Encryption Made Easy: The Advantages of Identity Based Encryption", Proofpoint, Inc., Sunnyvale, California, 2005.

Schneier, Applied Cryptography, 1996, John Willey & Sons, 2nd Edition, pp. 179-180.

U.S. Appl. No. 13/112,931—Final Office Action dated May 15, 2013.

U.S. Appl. No. 13/112,931—Non-Final Office Action dated Nov. 2, 2012.

U.S. Appl. No. 13/112,931—Notice of Abandonment, dated Nov. 6, 2014.

Wong, M. et al., "RFC 4408—Sender Policy Framework (SPF) for Authorizing Use of Domains in E-Mail, Version 1", Network Working Group, the Internet Society; Apr. 2006.

Zhao, Gansen, et al. "Trusted data sharing over untrusted cloud storage providers." Cloud Computing Technology and Science (CloudCom), 2010 IEEE Second International Conference on IEEE, 2010.

\* cited by examiner

SECURE CREDENTIALS CONTROL METHOD

CROSS-REFERENCE TO RELATED APPLICATIONS

This application is a continuation of U.S. patent application Ser. No. 16/105,797, now issued as U.S. Pat. No. 10,929,546, filed Aug. 20, 2018, which is a continuation of U.S. patent application Ser. No. 12/201,150, now issued as U.S. Pat. No. 10,055,595, filed Aug. 29, 2008, which claims the benefit of the filing date of U.S. provisional patent application Ser. No. 60/969,120, entitled "SECURE PASSWORD CONTROL METHOD," filed Aug. 30, 2007, the entire contents of which are incorporated herein by reference.

BACKGROUND OF THE INVENTION

Field of the Invention

The present invention relates generally to securing access to a user account.

Description of the Related Art

The typical electronic mail (email) application allows system administrators unrestricted access to email accounts and credentials of users, including such components as the user name, or login, and password of each user. Typically, the system administrator may have direct permission to view secure access features, such as passwords and other credentials, of the user. Such permission may allow a system administrator to read, edit and delete email messages or other data of any user without the knowledge of the user. Such access also may allow the system administrator to send email messages from an email account of a user even without the permission of the user, which may give the appearance to recipients that the user has sent the email message.

One need is for apparatus, methods, and systems which may control the credentials of users in a manner, which may prevent system administrators from misusing account permissions as well as reducing the threat of other, unauthorized access. This need and others may apply not just to email accounts but to other types of data, including financial, credit, and retail accounts, and account types such as instant messaging and Internet Protocol Telephony (IP Phone) that are secured from access by parties other than a user.

SUMMARY OF THE INVENTION

The present invention includes a method, apparatus and systems for securing access to a user account, wherein the account has at least a first credential, such as password, set as an access feature for authenticating the user. The method includes setting a universal reset credential associated with the account; denying a system administrator of the account permission to access the first credential; and permitting the system administrator to reset the access feature from the first credential to the universal reset credential.

BRIEF DESCRIPTION OF THE DRAWINGS

For a more complete understanding of the present invention reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, specific details, and the like have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or as software instructions for enabling a computer to perform predetermined operations, where the software instructions are embodied on a computer readable storage medium. In certain embodiments, the predetermined operations of the computer are performed by a processor such as a computer or an electronic data processor in accordance with code such as computer program code, software, and, in some embodiments, integrated circuits that are coded to perform such functions.

It is to be understood by persons of ordinary skill in the art that the secure credential control method may be implemented in other systems besides electronic mail account systems. For example, banking account, credit card account, retail account, or any other set of personal or organizational data systems that are intended to be securely maintained may be further secured by use of the secure credential control methods and apparatus herein described. The use of an email account as a user account is intended as illustrative of the present invention rather than limiting the apparatus and methods described herein.

The secure credential control methods, apparatus and systems, in certain embodiments, may track password reset and reactivation of the account with a new password. in other embodiments, the disclosed methods may be utilized to track other user credentials such as user login identification, private information, or other indicia of identity or access to secure systems. The use of passwords as a credential or a universal reset credential is intended as illustrative rather than limiting of the methods and apparatus described herein.

Figure 1:
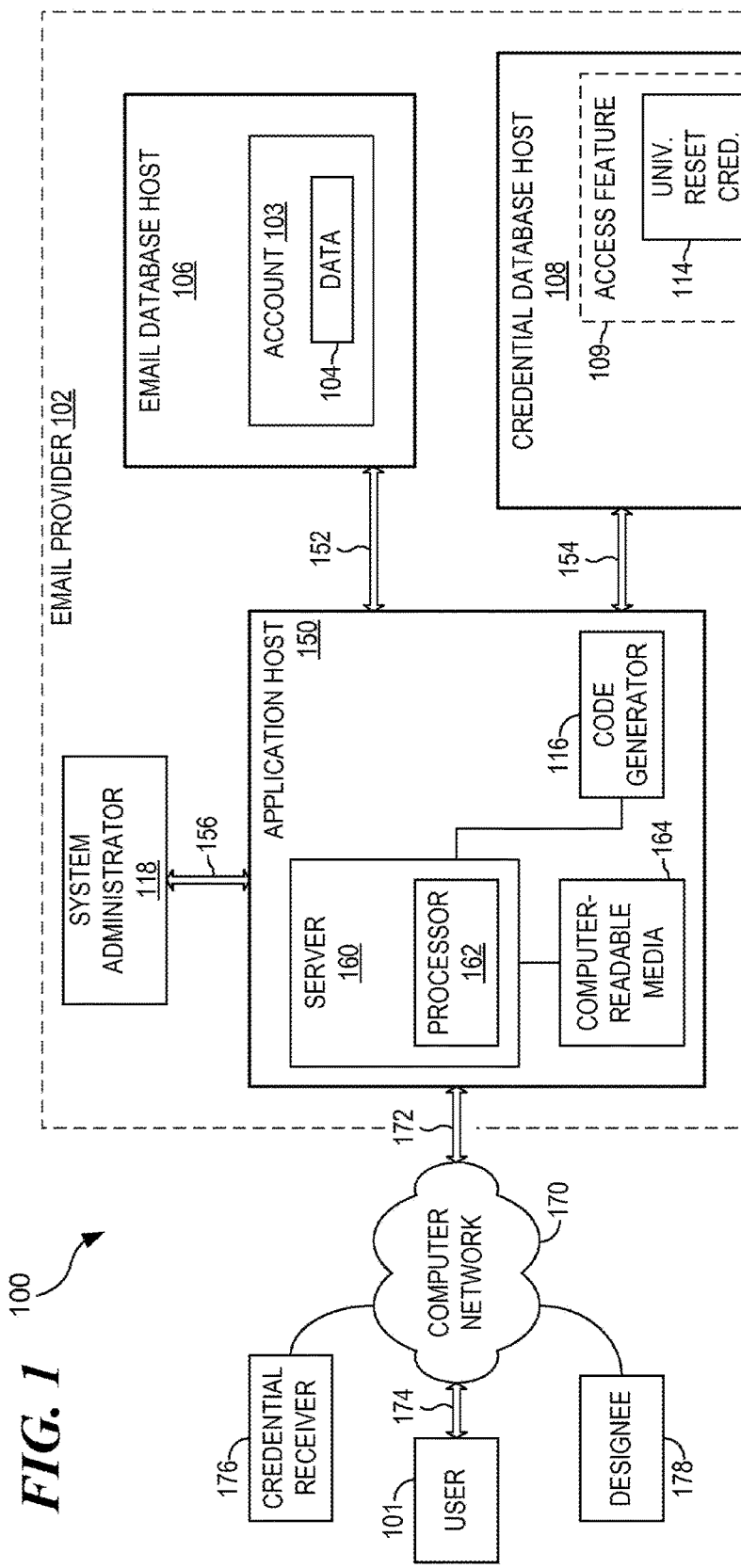
FIG. 1 illustrates a system for secure credential control in one or more embodiments.
Figure 2:
FIG. 2 illustrates details of a credential in one or more embodiments.

Referring now to FIGS. 1 and 2, there is shown a system 100, in one or more embodiments, for securing an account of a user. In the system 100, a user 101 may create or modify an account 103, such as an email account, hosted within an email provider 102. The account 103 may include secure data 104, such as email messages. The email provider 102 may comprise an email database host 106, which may provide storage space for the account 103 and the secure data 104.

The email provider 102 may further comprise a credential database host 108. The credential database 108 may host an access feature 109 which is associated with the account 103 of the user 101. The access feature may be a form of user input data, where the data authenticates the permission of the user to access the email account. The access feature 109 may include one or more credentials of the user used alone or in combination to authenticate the user. In some cases, the access feature may be a comprised of credentials such as a password, a biometric, a combination, or a key. One example of an access feature is a user id and password. The user id and password may form a credential for gaining access to an account. In other examples, a user id may be used in conjunction with a biometric like a retinal scan to gain access to secure data on an account. It is to be further understood by persons of ordinary skill in the art that biometric systems may include as voice, finger print, and retinal scan, keys may include as electronic encryption keys, numerical codes, and physical keys, RFIDs and other for ins of data, schemes, and algorithms which are found in the art as relied upon for authentication of users attempting to access secure data and information. It should be understood by persons of ordinary skill that credentials may take many forms, such as those included here, that are known in the art.

Referring again to FIG. 1, the access feature 109 may comprise one or more credentials, such as a universal reset credential 114, a first credential 110 and a second credential 112. The credential database host 108 may be further partitioned to separate the universal reset credential 114 from other credentials (shown in FIG. 1 as first credential 110 and second credential 112). In some embodiments, the secure partition 115 may serve at least to provide a secure location to store credentials to restrict access from at least a system administrator 118. It should be understood by a person of ordinary skill in the art that the secure partition 115 may be implemented internally within a processor by software embodied on a computer storage medium or the secure partition 115 may be physically a separate database host.

In certain embodiments, the account 103 of the user 101 may have a universal reset credential 114, which may be set as a fallback setting to the access feature 109 and enabled at the time the account 103 is created or installed. The system administrator 118 may at any time be permitted to reset the access feature 109 to the universal reset credential 114, but the system administrator may not be allowed to change the access feature 109 back to the original password chosen by the user. This account set up may prevent the system administrator 118 from gaining access to the email account of the user. In one embodiment, the system administrator 118 may be prevented from resetting the access feature 109 to a password that only the system administrator 118 may know and then changing the access feature 109 back to the original password without the knowledge of the user 101.

The universal reset credential 114 may comprise data used to access the account 103 in the case of a change or reset to one or more credentials is made. Such data may be a password, a key, a combination, or a biometric. In some embodiments, the universal reset credential may also comprise data such as the identity of a credential receiver 176.

The credential database host may further comprise other data related to the credentials 110, 112, and 114 of the user 101. For example, the secure partition 115 may comprise an event database 117 for storing and recording event information related to changes in the account. The time and date of any resets or changes to the account 103 may be stored in a secure table of the event database 117.

The account 103 may be managed by one or more system administrators 118. The functions of the system administrator 118 may be performed by a person or an electronic entity, such as a processor running software code embodied on computer readable storage medium.

Referring to FIG. 2, the second credential 112 may further comprise a first part 119 and a second part 120. The first part 119 may comprise a computer generated code. The second part 120 may comprise an indicia of identity for a credential receiver 176. Such indicia may comprise a phone number or an email address. It should be understood by a person of ordinary skill in the art that the indicia of identity 120 may take on many forms of information to identify a credential receiver 176.

Referring again to FIG. 1, the email database host 106 and the credential database host 108 may be operationally connected by a first connection 152 and a second connection 154, respectively, to an application host 150. The first connection 152 and the second connection 154 may comprise network connections. The system administrator 118 may be operationally connected to the application host at third connection 156, which may also comprise a network connection. The system administrator 118 may comprise a terminal or other system input device for managing the account 103. It should be understood by a person of ordinary skill in the art that a network connection may include any number of types of connections, such as secure internet connections, Secure Socket Layer (SSL) and Transport Layer Security, or non-secure network connections.

The connections 152, 154, and 156 may be configured to secure access to secure data 104 stored on email database host 106 and the access feature 109 of the credential database host 108, according to the operations disclosed herein in FIGS. 1 and 2. The application host 150 may comprise a server 160 housing at least one processor 162 and a computer readable storage medium 164. Software, in the form of computer executable code, may be embodied on the computer readable storage medium 164 for execution on the processor 162. The processor 162 may implement the operations described herein and disclosed in FIGS. 3 and 4.

Further referring to FIG. 1, the application host 150 may be operationally connected to a computer network 170, such as the internet or a private network, at a fourth connection 172, which may be configured for network communications including internet, telephone, cell phone, and other forms of telecommunications. It should be understood by a person of ordinary skill in the art that a network connection may include any number of types of connections, such as secure internet connections, Secure Socket Layer (SSL) and Transport Layer Security, or non-secure network connections. The fourth connection 172 may be configured to receive and transmit communications to the user 101, to the credential receiver 176, and to a designee 178 of the user 101. The user 101 may receive and transmit data to the system 100 by a fifth connection 174. The fifth connection 174 may comprise a network connection, such as secure internet connections, Secure Socket Layer (SSL) and Transport Layer Security, or non-secure network connections.

In certain embodiments, the second credential 112 may be used by the system 100 to access the secure portions of the email account 103, such as data 104. The second credential 112 may comprise, in part, a sequence of text characters, which may be generated randomly by a processor or computer connected to the system. In one embodiment, a code generator 116 operationally connected to the server 160 may provide a code comprising the first part 119 to the system for use as a portion of the second credential 112. For example, access to the email account 103 of user 101 may require the user password, as the first credential 110, and the code randomly generated by the email provider 102, as the second credential 112. The email provider 102 may send the code to the credential receiver 176 enclosed in a message to a cell phone of the user 101 as a text message. With these two credentials 110 and 112, the user 101 may authenticate permission to access secure data 104 on the email account 103.

The user 101 may choose what device or alternate location to designate as the credential receiver 176. It is to be understood by persons of ordinary skill in the art that the credential receiver 176 may be any communication device or separate account to which the user 101 has access. For example, the user 101 may receive the first part 119 of the second credential 112 at a separate email or to the cell phone of a friend or relative. In some embodiments, the identity of the credential receiver 176 comprising the second part 120 may be kept secret from the system administrator 118, and the identity of credential receiver 176 may form a part of the second credential 112. The universal reset credential 114 may include data 121 identifying a universal reset credential receiver.

A notification of change or reset to the second credential 112, including changes to the identity of the credential receiver 176, may be sent to a designee of the user 101. The notification may include information related to the change or reset, including time and date and the new identity of the credential receiver 176.

Figure 3:
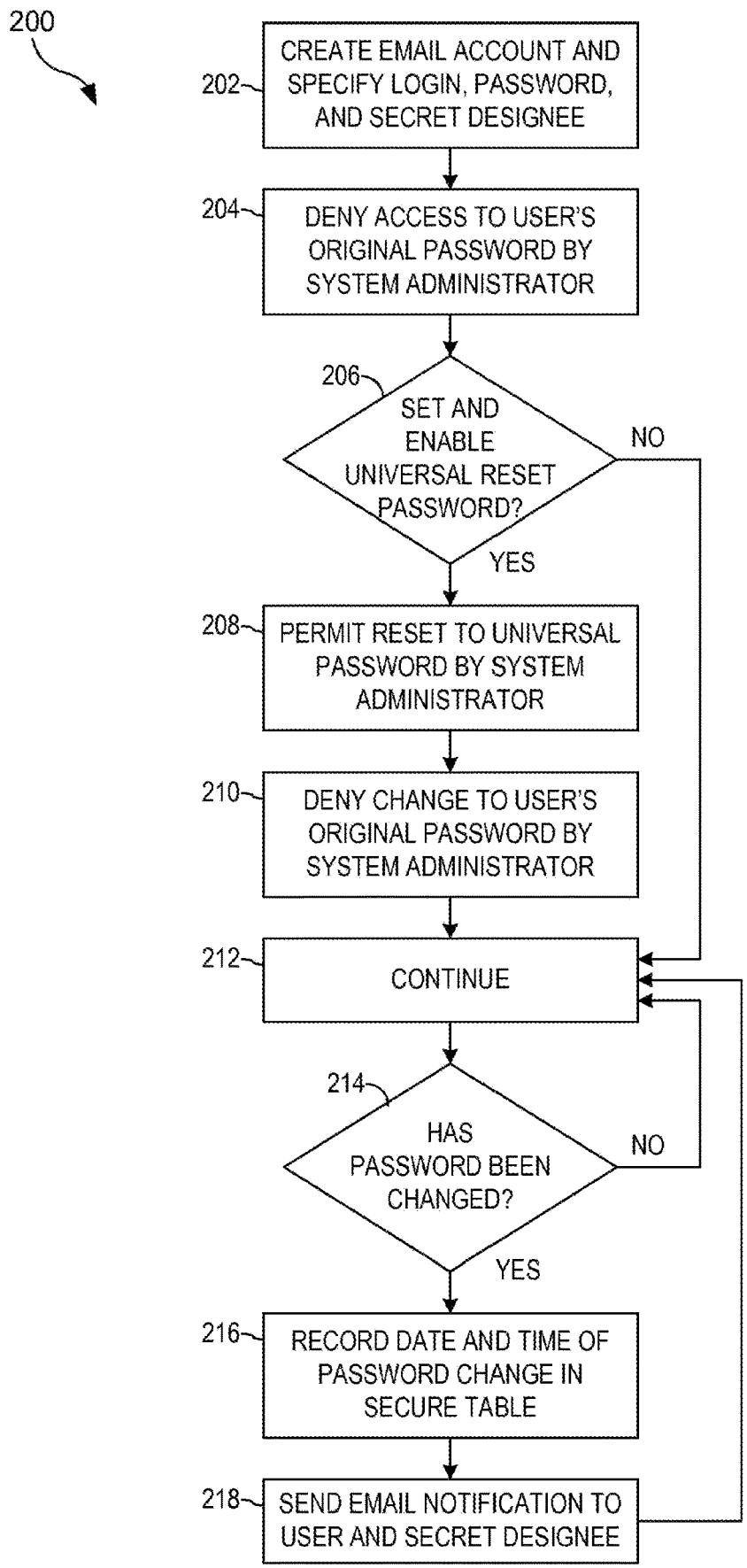
FIG. 3 illustrates the operations of a method of secure credential control in one or more embodiments.

Referring now to FIG. 3, in an embodiment a method 200 may be employed. At the creation of a new user email account, the user may typically specify a plurality of credentials such as a user name, or login, and an original password (202). These credentials may form at least a portion of the access feature of the account. Such credentials may also be specified during an account reset where, for example, the user is changing the user name or some other credential associated with the account. Such account resets may also follow security breaches or other events that necessitate account changes.

The user may also designate one or more persons or entities to receive notifications of account changes. For example, the designee 178, as shown in FIG. 1, may be a person that the user 101 designates when the user 101 first creates an account 103. The designee 178 may have an indicia of identity, such as name, phone, email, or other similar designator, that is kept secret from the system administrator, who has the capability of making account changes and otherwise viewing account settings. The indicia of identity may be stored in a partitioned memory storage, such as secure partition 115, where the system administrator may lack access or permissions to modify.

The designee may receive one or more notifications from the email provider 102 indicating to the designee that a change has occurred to the account. A notification may comprise an email notification related to the status of the email account. Other types of notifications may include phone automated calls, text messages, other forms of notification that are obvious to a person of ordinary skill.

Optionally, in operation 204, permission to access the original user password may be denied to the system administrator. The system administrator may be restricted from viewing the user password and may be restricted from making changes to the user password, depending on account settings.

As a user option, a universal reset password may be set and enabled for the user (206). The user may choose this universal reset password or the user may allow the account provider to generate it, for example, randomly. The universal reset password may be a credential such as a password or other text string, biometric, sound, or visual cue that an email account may utilize to authenticate the user and access the account. In certain embodiments, the user has the option to enable this feature, and may, at the choice of the user, disable it, as shown in operation 206.

In embodiments where the universal reset password is enabled, a system administrator may have permission to reset the access feature of the account from the user password to a universal reset password (208). The universal reset password may be viewed and known to the administrator, allowing him to access the account, for example, in the case that a user has forgotten the user password or cannot access the account. The system administrator, however, may not have permissions to change the universal reset password. The system administrator may be denied permission to set the access feature back to the original user password from the universal reset password once the account has been reset. Only the user may change the universal reset password, once the user passed other security measures which may be designed to protect the integrity of the universal reset password.

Also, the administrator may be denied permission to change the user password in cases where the universal reset password feature has been enabled (210). The administrator may be restricted to resetting the access feature to the universal reset password (208). A reset may occur when the user has neglected to change the user password at the instruction of the account provider. In one example, when the user refuses to change the user password after a set amount of time, the access feature may be set to null, leaving an account without a password. At that point, the user may be instructed to choose a new password. An administrator may also initiate a reset because of a breach in the account security or in response to a request from the user, when, for example, the user loses his account password or other credential.

In the event of a reset, the user may still access the account through use of the universal reset password. The administrator may also access the account through the universal reset password, but be restricted from making any other change to the access feature. In this way, the administrator may not take unauthorized control of the account by changing the access feature from the user password to a password only within the knowledge of the administrator.

If the universal reset password feature is not set and enabled at operation 206, normal email account operation may continue at operation 212. In an account where the universal reset password is not enabled, the administrator may maintain permission to unilaterally change the password to a configuration that the administrator may choose.

The email account may be monitored at operation 214 for a change to the user password. A password change may differ from a reset to the password in that a reset occurs at an administrative level, usually initiated by the system administrator. A change to the user password may comprise a change initiated by the user, as part of a personal practice or as a response to a breach in the security in the user password. In some cases, a change to the user password may be initiated by an unauthorized third party, including the system administrator. A change to the user password may also be initiated by the account provider, as part of a regular practice to have users change their passwords periodically.

As a further feature of the method 200, the date and time, and other related information, of any change in the password or other account setting may be recorded and stored in a secure environment at operation 216. In some embodiments, the recording of the date and time may be triggered when the system administrator changes the user password, whether the system administrator has permission or not. Or the recording may occur when an unauthorized third party accesses or attempts to access a secure portion of the email account. The data relating to the change in password may be stored in a table (such as in event database 117 as shown in FIG. 1) on computer readable medium, on a network, or in another environment that is separate and secured from access by third parties, such as the system administrator.

A notification to the user informing the user that the user password has been changed may also be sent to the user and the designee of the user (218). The notification may be an email, a text message, a phone or voicemail message, or other form of notification. The user may designate one or more persons or institutions to monitor notifications sent from the account that flag changes in the account or attempts to access the secure portion of the email account. Thereafter, the method 200 may continue normal email account operation at operation 212.

Figure 4:
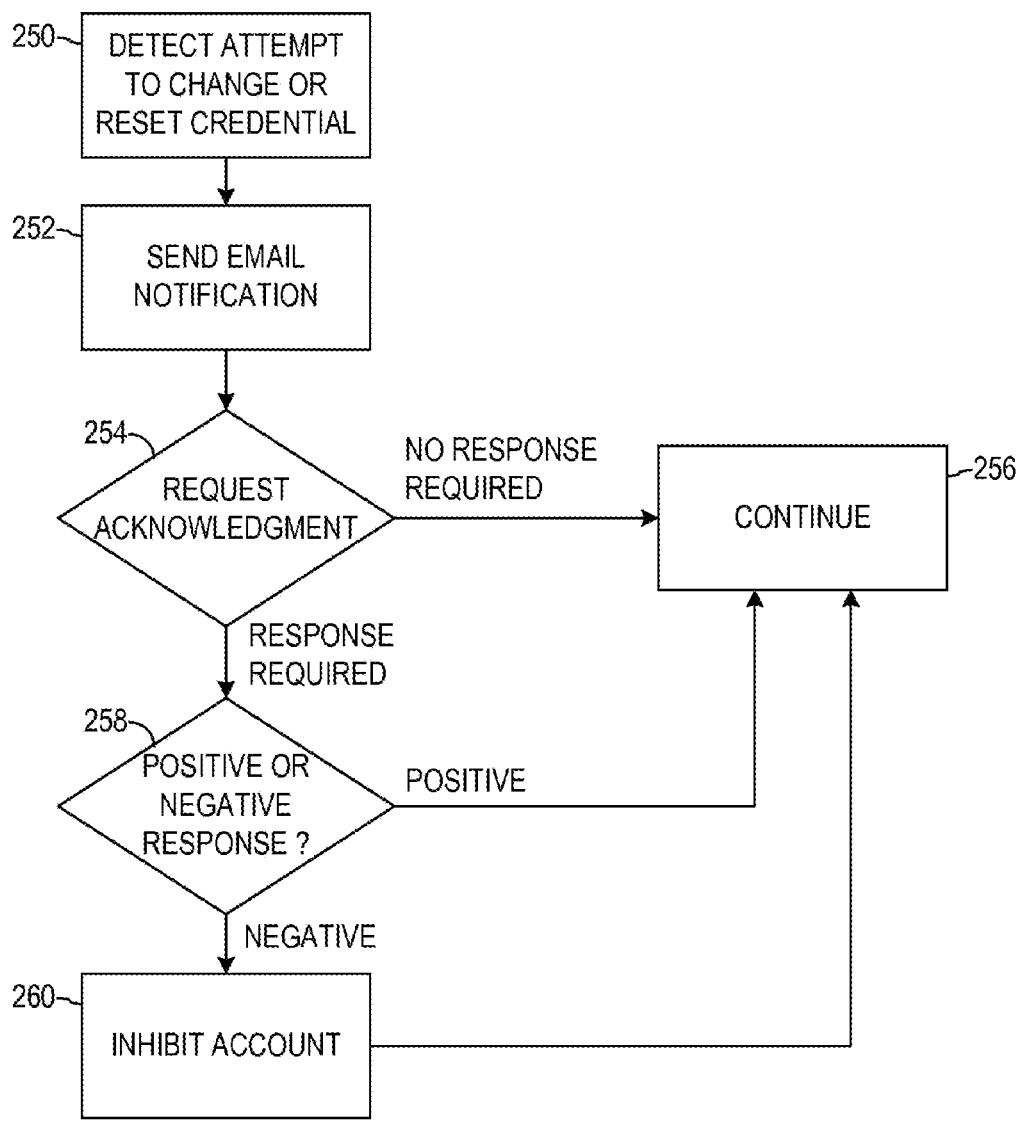
FIG. 4 illustrates the operations of at least a portion of a method of secure credential control in one or more embodiments.

Referring now to FIG. 4, there is shown an alternative embodiment for the configuration and role of notifications used in the methods herein described. hi certain embodiments, the system 100 (as shown in FIG. 1) in operations 217 and 218 of FIGS. 3 and 4 may also include a request for the acknowledgement of the user or the designee as a recipient of the notification. Upon a detection of an attempt to change or reset a credential, such as a password, as in operation 250, an email notification may be sent to the user or designee of the user (252). The recipient may be required to actively or passively acknowledge the receipt of the notification, and, in some embodiments, approve or disapprove of the change in account settings (254). If no acknowledgement is required, the system may continue normal operation (256).

In certain embodiments, a response to the acknowledgement may be requested from the recipient of the notification (258). The response may comprise a passive positive response, such as a read receipt generated automatically when the recipient reads or opens the notification, in the case of an email. The system 100 may consider a non-response as a received negative passive response and may inhibit the account until the recipient opens or access the notification.

The acknowledgement may also comprise a request for a positive or negative active response required from the recipient and received by the email provider. For example, the recipient may approve of the reset to the first or second credential by responding to the email with another email or a phone call. The email provider may receive this response and interpret it as an indication to continue with the change to the account. Or, alternatively, the recipient may actively reject the reset by sending a message to the provider, which, in some embodiments, may cause the email provider to inhibit the account (260), upon the receipt of the message.

Inhibiting the account (260) may comprise freezing all account activity until the user meets further security measures, returning the account to pre-change or reset settings, or alerting other personnel within the email provider of a potential breach in security. It is to be understood that inhibiting the account may comprise any number of combination of activities which may, in some cases, prevent a breach in security.

A positive response, whether active or passive, may approve of the change and allow the normal operations to continue (256).

Figure 5:
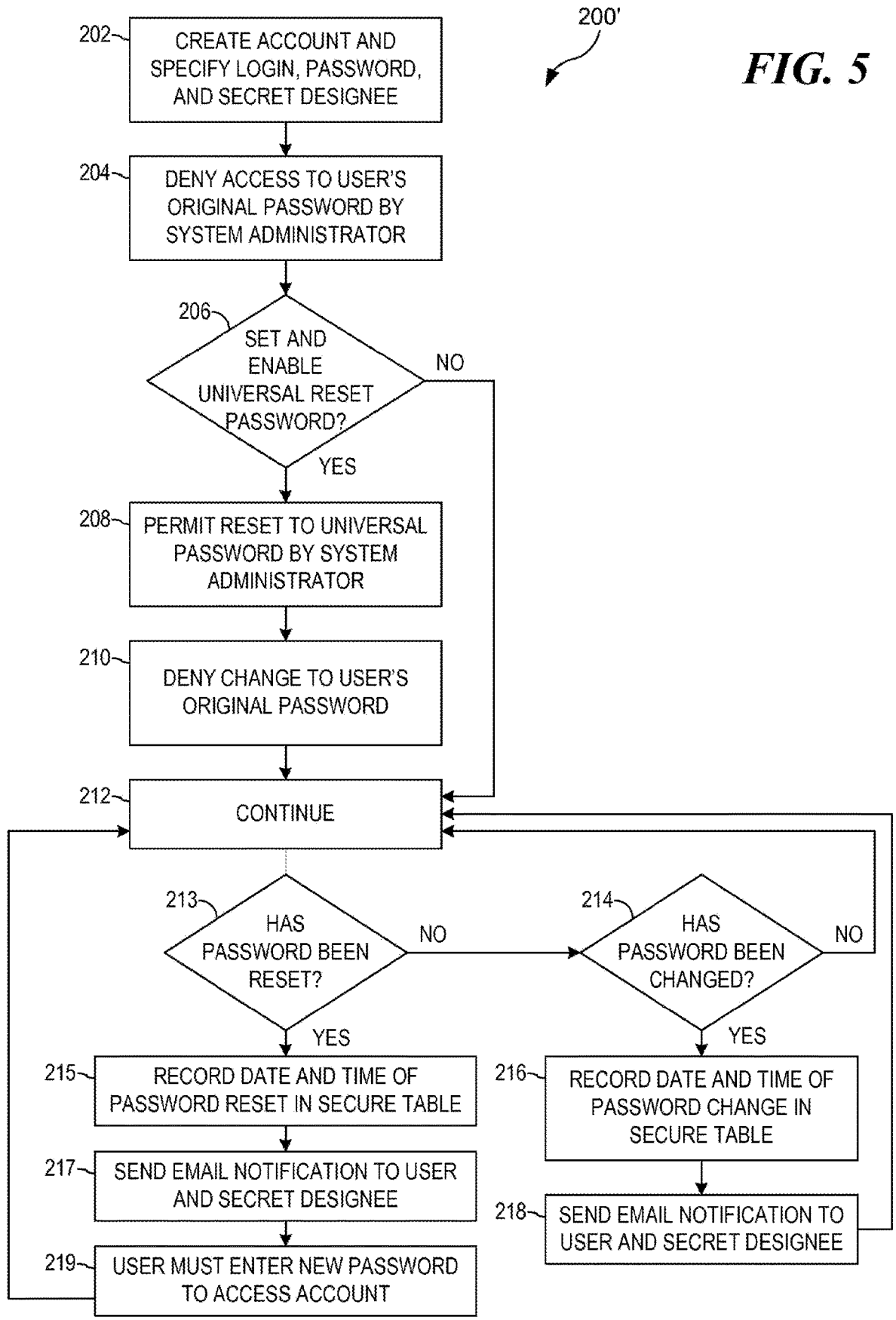
FIG. 5 illustrates the operations of another method of secure credential control in one or more embodiments.

Referring now to FIG. 5, a method 200' may be employed for securing a user account, such as an email account. At the creation of a new user email account, the user may typically specify a user name, or login, and an original user password, and designate a person or entity to receive notifications of account changes (202). These components may form an access feature that allows the user to authenticate his permission to access the secure data stored in the account. In some embodiments, access to the access feature may be denied to the system administrator (204). For example, the system administrator may be denied permission to change the original user password.

Optionally, a universal reset password may be enabled for the user and set by the user (206). In embodiments where the universal reset password is enabled, a system administrator may be permitted to reset the access feature from the original password to a universal reset password (208). Also, the administrator may be denied permission to change the original password in cases where the universal reset password feature has been enabled (210). In the case where the access feature is reset to the universal reset password, the system administrator may be denied permission to change the access back to the original password. If the universal reset password feature is not set and enabled at operation 206, normal email account operation may continue at operation 212.

Further referring to FIG. 5, as an on-going process, the user password may be monitored by the email provider to determine whether the user password has been reset (213). The user password may be reset by the system administrator as a function of a maintenance procedure, such as if the user has the user password, or if a new system administrator has been appointed and has consequently changed the universal reset password, or any other procedure that may require the system administrator reset the user password.

If the user password has been reset, the date and time of the password reset event may be recorded and stored in a secure table that may be available for inspection by the user (215). Other related information such as the IP address of the party accessing the email account, the number of failed attempts to access the account, or what information was accessed following the change may also be recorded to the secure table. The secure table may be secured from access by the system administrator or other individuals or entities. A notification, such as by email, may be sent to the user and the designee of the user informing the parties that the user password has been reset (217). As described above in reference to FIG. 4, the notification may request an acknowledgement which may elicit a passive or active response from the recipient (254).

After a password reset, the user may be required to enter a new password the next time the user accesses the account. The user may be asked to enter the user password and then enter a new password to, verify that no one else has been able to access the email account of the user, and therefore no one else been able to read the email messages of the user or send email messages from the user's email account. After the user enters a new password at operation 219, the method 200' may continue normal email account operation at operation 212.

Even if the user password has not been reset at operation 213, the account may be monitored to determine whether the user password has been changed at operation 214. A change to the user password may comprise a change initiated by the user, as part of a personal practice or as a response to a breach in the security in the user password. In some cases, a change to the user password may be initiated by an unauthorized third party, including the system administrator. A change to the user password may also be initiated by the account provider, as part of a regular practice to have users change their passwords periodically.

If the user password has been changed, the date and time of the password change may be recorded and stored in a secure table that may be available for inspection by the user (216). Other related information such as the IP address of the party accessing the account, the number of failed attempts to access the account, or what information was accessed following the change may be included in the secure table. The secure table may be secured from the account system administrator or other individuals or entities. A notification, such as by email, may be sent to the user and the designee of the user informing the parties that the user password has been reset (218). As described above in reference to FIG. 4, the notification may request an acknowledgement which may elicit a passive or active response from the recipient. Thereafter, the method 200' may continue normal email account operation at operation 212.

In some embodiments, a code comprising at least a portion of the second credential may be reset to the universal reset credential in a manner similar to the reset of the first credential. For example, the system administrator may be denied permission to access the second credential. The system administrator may be permitted to reset the portion of the access feature relating to the second credential to the universal reset credential. In other embodiments, the code may be regenerated by the generator and resent to the credential receiver.

In certain embodiments, the universal reset credential may include indicia identifying a universal reset credential receiver. In some cases, the credential receiver may be reset to the universal reset credential receiver. For example, should the user lose the credential receiver, such as a cell phone, the user may request that the system administrator reset the credential receiver to the universal reset credential receiver, which may be a personal email address. The user may use the universal reset credential receiver to receive the randomly generated code, which may comprise at least a portion of the second credential. In addition, the system administrator may be restricted from resetting the user designated credential receiver to only the universal reset credential receiver. This may add another level of security or prevent the system administrator from sending the second credential, such as the random code, to a location at the exclusive control of the system administrator.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A system, comprising:
   a non-transitory computer-readable storage medium configured to store a plurality of instructions; and
   a processor coupled to the non-transitory computer-readable storage medium and configured to execute the plurality of instructions to:
   store, in a database of the system, an access feature set by a user for accessing secure data saved in an account, the access feature comprising a user password and a universal reset credential, wherein the universal reset credential comprises data used to access the account in response to a reset of the account or a change to the user password;
   deny an access to the user password by a system administrator of the system;
   in response to detecting the reset of the account or the change to the user password, permit the system administrator to reset the access feature of the account from the user password to the universal reset credential;
   prevent the system administrator from changing the universal reset credential back to the user password after the reset of the account without the user's acknowledgement; and
   record information relating to the reset of the account or the change to the user password.

2. The system of claim 1, wherein the secure data comprise information and data related to personal or organizational data systems that are intended to be securely maintained and accessed.

3. The system of claim 1, wherein the universal reset credential comprises information relating to a universal credential receiver.

4. The system of claim 3, wherein the universal reset credential comprises a universal reset credential receiver, and the processor is further configured to permit the system administrator to reset the universal credential receiver to the universal reset credential receiver.

5. The system of claim 1, wherein the universal credential receiver comprises at least one of a cell phone number of the user and a personal email address of the user.

6. The system of claim 5, wherein the processor is further configured to send a notification to the universal credential receiver informing the user the reset of the account or the change to the user password.

7. The system of claim 6, wherein the notification comprises at least one of an email, a text message, and a phone or voicemail message.

8. The system of claim 6, wherein the notification is configured to include an acknowledge request from the user regarding the reset of the account or the change to the user password.

9. The system of claim 8, wherein the processor is further configured to receive a passive positive response from the user, wherein the passive positive response includes a read receipt generated automatically when the user reads or opens the notification.

10. The system of claim 8, wherein the processor is further configured to receive a positive or negative active response from the user to approve or reject the reset of the account or the change to the user password.

11. The system of claim 10, wherein the processor is further configured to inhibit any access to the account in response to receiving the negative active response from the user rejecting the reset of the account or the change to the user password.

12. The system of claim 1, wherein the processor is configured to prevent the system administrator from changing the access feature without the user's acknowledgement by preventing the system administrator from changing the user password where the universal reset credential has been enabled.

13. The system of claim 12, wherein the processor is configured to receive a response from the user to enable or disable the universal reset credential in the account.

14. The system of claim 12, wherein the processor is configured to generate the universal reset credential randomly.

15. The system of claim 1, wherein the processor is configured to prevent the system administrator from changing the access feature without the user's acknowledgement by preventing the system administrator from changing the universal reset credential back to the user password after the access feature is reset to the universal reset credential.

16. The system of claim 1, wherein the processor is configured to store and record event information related to changes in the account.

17. The system of claim 16, wherein the event information include date and time information of each change in the account.

18. The system of claim 16, wherein the event information include an IP address of a party accessing the account, the number of failed attempts to access the account, or what information was accessed following each change in the account.

19. The system of claim 16, wherein the processor is configured to prevent the system administrator from accessing the event information.

\* \* \* \* \*